United States Patent
Yang

(10) Patent No.: US 8,700,997 B1
(45) Date of Patent: Apr. 15, 2014

(54) METHOD AND APPARATUS FOR SPELLCHECKING SOURCE CODE

(75) Inventor: Don Hsi-Yun Yang, Milpitas, CA (US)

(73) Assignee: Google Inc., Mountain View, CA (US)

( * ) Notice: Subject to any disclaimer, the term of this patent is extended or adjusted under 35 U.S.C. 154(b) by 200 days.

(21) Appl. No.: 13/352,539

(22) Filed: Jan. 18, 2012

(51) Int. Cl.
G06F 17/00 (2006.01)
G06F 9/44 (2006.01)

(52) U.S. Cl.
USPC ........... 715/257; 715/234; 715/259; 717/106; 717/114

(58) Field of Classification Search
None
See application file for complete search history.

(56) References Cited

U.S. PATENT DOCUMENTS

| | | | | |
|---|---|---|---|---|
| 5,258,909 A | * | 11/1993 | Damerau et al. | 715/257 |
| 6,889,361 B1 | * | 5/2005 | Bates et al. | 715/257 |
| 8,074,172 B2 | * | 12/2011 | Kocienda et al. | 715/263 |
| 2002/0078106 A1 | * | 6/2002 | Carew et al. | 707/533 |
| 2004/0111475 A1 | * | 6/2004 | Schultz | 709/206 |
| 2005/0125217 A1 | * | 6/2005 | Mazor | 704/1 |
| 2005/0235031 A1 | * | 10/2005 | Schneider et al. | 709/203 |
| 2008/0155399 A1 | * | 6/2008 | Kock | 715/259 |
| 2009/0083028 A1 | * | 3/2009 | Davtchev et al. | 704/9 |
| 2013/0061139 A1 | * | 3/2013 | Mahkovec et al. | 715/257 |

\* cited by examiner

*Primary Examiner* — Maikhanh Nguyen
(74) *Attorney, Agent, or Firm* — Honigman Miller Schwartz and Cohn LLP

(57) ABSTRACT

In one aspect, a spellchecker is provided that differentiates between code and natural language parts of a source code file. In operation, the spellchecker identifies a string in the source code file and attempts to classify the string as inducing programming language instructions or natural language words. If the sting is classified as including natural language words, the spellchecker outputs an indication of a spelling mistake in the string. Otherwise, if the string is not classified as including natural language words, the spellchecker does not output indications of spelling mistakes found in the string.

12 Claims, 5 Drawing Sheets

```
// Example of a Source Code File                    210 include <stdio.h> typedef struct {void *ptr;} PtrContainer;      220 int main() {                 230 const char *kText[] = "a constant piece string";

Print len (""
          hello
          worlt
          "")}+1                    240 printf(" this is an eample of a while loop.\n");     250 int count = 0; /* declare count as an integer of 0 */
int max = 10; /* declare max as an integer of 10 */       251
char msg[]="Test!\n"; /* define message as a string with text 'test' */
while(count < max) { /* loop the below statement until count = or > max */
  fprintf(stderr, "%i: %s", count, msg); /* foreach loop print the results */
  count++; /* increase count by 1 */
}
}
```
                                                                    260
                                                    261
                                            262
                                158

Fig. 2

```
//Example of a Source Code File include <stdio.h> typedef struct {void *ptr;} PtrContainer;

int main() { const char *kText[] = "a constant piece string";

Print len (""
          hello
          worlt
          "")}+1 printf(" this is an eample of a while loop.\n");

int count = 0; /* declare count as an integer of 0 */
int max = 10; /* declare max as an integer of 10 */
char msg[]="Test!\n"; /* define msg as a string with text 'test' */
while(count < max) { /* loop the below statement until count = or > max */
  fprintf(stderr, "%i: %s", count, msg); /* foreach loop print the results */
  count++; /* increase count by 1 */
}
}
```

Fig. 3

METHOD AND APPARATUS FOR SPELLCHECKING SOURCE CODE

BACKGROUND

Spellcheckers are software applications that process documents to recognize incorrectly spelled words. Conventional spellcheckers, while effective at processing natural language documents, such as student papers, may yield false positives when processing source code files. For example, source code files include programming language instructions such as "printf" or "System.out.println," which are not part of the English language vocabulary. If a spellchecker were to process these words as if they were natural language words, the spellchecker is likely to flag them as being misspelled. The spellchecker, in other words, would likely produce false positives.

SUMMARY

In one aspect, a method is provided for spellchecking a source code file. The method includes storing, in a memory, the source code file and a list of candidate delimiters, selecting, by a processor, a delimiter from the list of candidate delimiters, and selecting a first string and a second string from the source code file. The method further includes comparing the first string to the second string, classifying the first string as natural language, and generating an indication of a spelling error found in the first string. The first string may be classified as natural language, at least in part, based on the first string having fewer spelling errors than the second string. The indication of the spelling error may be output for presentation to a user only when the first string is classified as natural language.

The first string and the second string may both part of a line of text that is delimited by newline characters in the source code file, and the first string and the second string may be delimited, at least in part, by the selected delimiter. Moreover, in some instances, the selected delimiter may include a non-printable character, a combination of multiple characters, and/or an alphanumeric character.

In another aspect, a computer-implemented method for spellchecking source code files is provided. The method includes storing, in a memory, a source code file and a list of potential delimiters, and selecting a delimiter from the list of potential delimiters. The method further includes processing the source code file to select a string from the source code file that is delimited at least in part by the selected delimiter, checking spelling of the selected string to identify a set of misspelled words therein, classifying, by a processor, the selected string as natural language, and generating an indication that a word in the selected string is misspelled. The selected string may be classified based on a characteristic of the set of misspelled words. The indication may be output for presentation to a user only when the selected string is classified as natural language.

The method may further include, determining a count of any misspelled words in the selected string. The characteristic may further include the count of misspelled words or a pattern in which misspelled words and correctly spelled words are arranged in the selected string.

The method may further include determining a count of any misspelled words in the selected string, and adjusting the count based on a type of a spelling error found in the selected string. In some examples, the characteristic may be based on the adjusted count of misspelled words.

The method may further include determining a count of any spelling errors in the selected string. The characteristic may be based on the spelling error count. The selected delimiter may include a non-printable character, an alphanumeric character, or a character combination.

In yet another example, a computer-implemented method for spellchecking files is provided. The method includes storing, in a memory, a file that contains text. The text may include one or more portions that include a first type of content, and one or more portions that include a second type of content. The method further includes processing the file to select a string therefrom, checking spelling of the string to identify a non-empty set of misspelled words, and classifying, by a processor, the string as including at least one of the first type of content and the second type of content. The string may be classified based on a characteristic of the non-empty set of misspelled words. When the string is classified as including the first type of content, an indication that a word in the string is spelled incorrectly may be prepared. The indication may be prepared only when the string is classified as including the first type of content and not including the second type of content.

The method may further include selecting, by the processor, a delimiter from a list of candidate delimiters, wherein the string is selected based on being at least partially delimited by the selected delimiter. The selected delimiter may include a plurality of characters.

The method may further include determining a count of misspelled words in the string, and adjusting the count of misspelled words based on a type of spelling error found in the string. The characteristic may include the adjusted count of misspelled words.

In some instances, the string may include a part of a line of the text or one or more lines of the text. Moreover, in some instances, the characteristic may be a count of misspelled words in the string or a pattern in which misspelled words and correctly spelled words are arranged in the string.

In yet another aspect, a system is provided for spellchecking a source code file. The system may include a memory coupled to a processor. The memory may be configured to store a source code file, and a list of candidate delimiters. The processor may be configured to select a first delimiter from the list of candidate delimiters, process the source code file to identify a first string in the source code file that is delimited at least in part by the first delimiter, check spelling of the first string to identify a first set misspelled words in the first string, and determine whether the first string meets a predetermined criterion. In response to determining that the first string fails to meet the predetermined criterion, the processor may select a second delimiter from the list of candidate delimiters, process the source code file to identify a second string in the source code file that is delimited at least in part by the second delimiter, and check spelling of the second string to identify a second set of misspelled words in the second string. When the second string satisfies the predetermined criterion, the processor may classify the second string as either natural language or programming language instructions and output indications of spelling mistakes in the second string. The second string may be classified based on a characteristic of the second set of misspelled words. The indications of the spelling mistakes may be output only when the second string is classified as natural language.

The predetermined criterion may be based on a characteristic of a first set of misspelled words. The first string may include one or more lines of source code or, alternatively, a portion of a line of source code. The first delimiter may include a character, character combination, and/or non-printable characters.

In yet another aspect, a computer-implemented method for spellchecking source code files is provided. The method includes storing, in a memory, a source code file and a list of potential delimiters and selecting a first candidate delimiter from the list of potential delimiters. The method further includes processing the source code file to select a string from the source code file that is delimited at least in part by the first candidate delimiter, checking spelling of the selected string to identify a set of misspelled words therein, and determining whether the first candidate delimiter is used to separate source code from comments in a programming language of the source code file. When it is determined that the first candidate delimiter is used to separate source code from comments in the programming language of the source code file, the selected string is classified, by a processor, as one of natural language or programming language. Then, an indication is generated that a word in the selected string is misspelled. Conversely, when it is determined that the selected candidate delimiter is not used to separate source code from comments in the programming language of the source code file, a second candidate delimiter is selected from the list of potential delimiters. The determination of whether the first candidate delimiter is used to separate source code from comments may be based on a first characteristic of the set of misspelled words. The classification of the second characteristic as one of natural language or programming language may be based on a second characteristic of the set of misspelled words. The indication may be output for presentation to a user only when the selected string is classified as natural language.

The method may further include determining a count of any misspelled words in the selected string. The second characteristic may include the count of misspelled words or a pattern in which misspelled words and correctly spelled words are arranged in the selected string. The first characteristic may be different from the second characteristic or, alternatively, the first characteristic may be the same as the second characteristic. The first string may include a non-printable character or a combination of characters.

BRIEF DESCRIPTION OF THE DRAWINGS

FIG. 2 depicts a schematic diagram of a source code file with different text block sections marked.

FIG. 3 depicts a schematic diagram of the source code file that includes indications of natural language words in the file being misspelled.

DETAILED DESCRIPTION

In one aspect, a spellchecker is provided that differentiates between code and natural language parts of a source code file. In operation, the spellchecker may select a first character from a list of symbols and may identify a string in the source code file that is at least partially delimited by the first character. Afterwards, the spellchecker may attempt to classify the string as including either programming language instructions or natural language words. If the string cannot be classified into any of the categories, the spellchecker may select a second character and repeat the above process.

In another aspect, the classification of each string involves identifying a set of spelling mistakes in the string. If the set of spelling mistakes meets a pre-determined criterion, the string corresponding to the set may be classified as including natural language. Only if the string is classified as natural language, will the spellchecker flag the spelling mistakes found in the string. In that regard, the spellchecker avoids flagging of spelling errors in parts of the source code file that are programming language instructions and not meant to be spellchecked.

Figure 1:
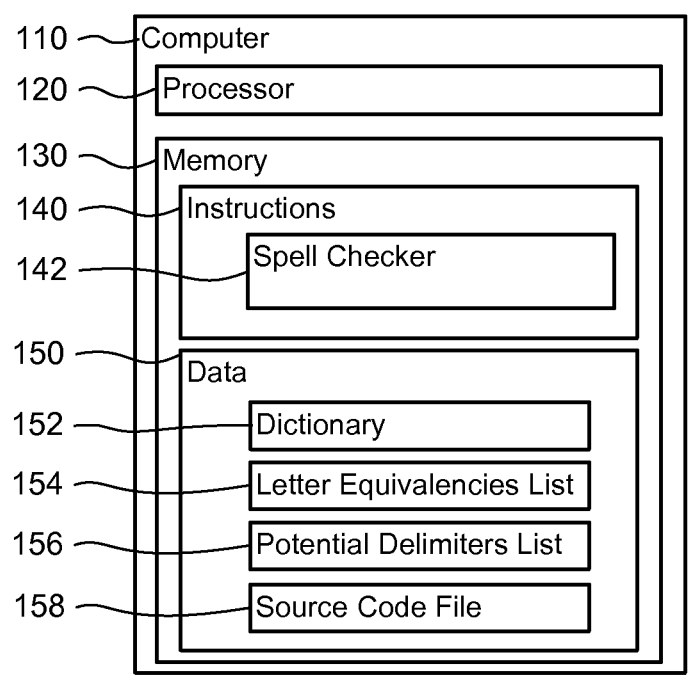
FIG. 1 depicts a schematic diagram of a system in accordance with aspects of the present disclosure.

As shown in FIG. 1, an exemplary system 100 may include computer 110. Computer 110 may contain a processor 120, memory 130 and other components typically present in general purpose computers. Computer 110 may be a personal computer, server, mainframe, laptop, desktop, cell phone, or any other processor-based computing device.

Memory 130 of computer 110 stores information accessible by processor 120, including instructions 140 that may be executed by the processor 120. The memory also includes data 150 that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 120 may be any well-known processor, such as commercially available processors. Alternatively, the processor may be a dedicated controller such as an ASIC.

The instructions 140 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The instructions 140 may include a spellchecker application 142. The spellchecker 142 may be either standalone software or a part of an Integrated Development Environment (IDE), text editor, or any other application that might benefit from having spell checking capabilities. The operation of the spellchecker 142 is further described in the discussion with respect to FIGS. 2-6.

Data 150 may be retrieved, stored or modified by processor 120 in accordance with the instructions 140. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

Data 150 may include dictionary 152, list 154, list 156, and source code file 158. Dictionary 152 may be a dictionary file (or data structure) that includes one or more words. List 154 may be a letter equivalencies list that relates letters to symbols that visually resemble the letters. List 156 may be a potential delimiters list. List 156 may include (i) a list of characters, (ii)

a list of character combinations, or (iii) a list of both characters and character combinations. Examples of dictionary 152, list 154 and list 156 are provided in FIG. 4.

File 158 may be a compiled language file, such as a JAVA, C++, or C source code file. Alternatively, file 158 may be a script file, such as an HTML, MATHLAB or WORD script. In another aspect, file 158 may be a document having English and foreign language sections, or a document including non-natural language words. An example of File 158 is provided in FIG. 3.

Although FIG. 1 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

FIG. 2 depicts an example of file 158. In this example, file 158 is a source code file that includes sections 210, 220, 230, 240, 250, 251, 260, 262, 261, and 262. Each of the sections is a string that includes at least one of: (i) a line of code, (ii) a plurality of lines of code; (iii) or a portion of a line of code.

FIG. 3 depicts an example of the output of spellchecker 142. As noted above, the spellchecker 142 may receive the file 158 and process it to find spelling mistakes. After the spellchecker 142 is finished processing the file, the spellchecker may mark only misspelled words, but not programming language instructions. For example, the spellchecker may indicate that the word "worlt," from section 240, is misspelled, but leave the word "typedef," from section 220, unmarked.

In operation, the spellchecker 142 may classify portions of source code file 158 as including either programming language instructions or natural language. The classification is motivated by the observation that the content of source code files, very broadly speaking, may fall into one of three types of groups—comments, code, and data (e.g., string literals). The comments and data portions of a source code file may mostly include natural language words, whereas the code portions may include programming language instructions for the most part. In some aspects, marking the spelling mistakes found in natural language words is necessary whereas the marking of spelling mistakes in programming language instructions is undesirable.

The code portions of a source code file include programming language instructions. In general, programming language instructions are intended for machine consumption (by a compiler, interpreter, or other software). Because they are intended for machine use, the flagging of spelling mistakes found in the code portions of a file may be undesirable. In the example of FIG. 2, portions 220, 230, and 240 are code portions.

The comments portions of a source code file include programmer-readable annotations that are ignored by compilers and interpreters. They may contain text that is kept for documentation purposes and intended to be read by human readers. In the example shown in FIG. 2, portions 210 and 260 are comments portions.

Comments in a source code file are delimited with special characters or character combinations. For example, in FIG. 2, the comments are delimited by the "//" and /*" character combinations. When compilers process source code files, they recognize the comment delimiters and ignore text that is separated by them. The comment delimiters may be different in different programming languages and they depend on the programming languages' syntax specifications.

The spellchecker 142 may dynamically identify characters that are used as comment delimiters. The spellchecker 142 may do so by first picking different characters, identifying strings that are at least in part delimited by the picked characters, and then determining whether the delimited strings are comments. This guess-and-try approach requires no a priori knowledge of what characters (or character combinations) are used as comment delimiters in the syntax of the file that is being processed by spellchecker 142. It enables spellchecker 142 to remain agnostic with respect to programming language syntax.

The spellchecker 142 may use the same approach to dynamically identify string literal delimiters. Portion 250 of file 158 provides an example of a string literal. In particular, the command of 'printf("this is an example of a while loop");' includes the string literal "this is an example of a while loop" as its data portion. In this example, the string literal is delimited by quotation marks, but this notation may vary in different languages.

Regardless of how string literals are delimited, spellchecker 142 may identify string literals in the same way it identifies comments. It may select candidate string delimiters (e.g., quotation marks), identify strings delimited by the candidate delimiters, and then determine if the strings can be classified as including natural language. Upon a positive determination, spelling mistakes in the string literals may be flagged. The flagging may involve underlining the misspelled words with a red line or presenting another indication that a particular word is misspelled.

Figure 4:
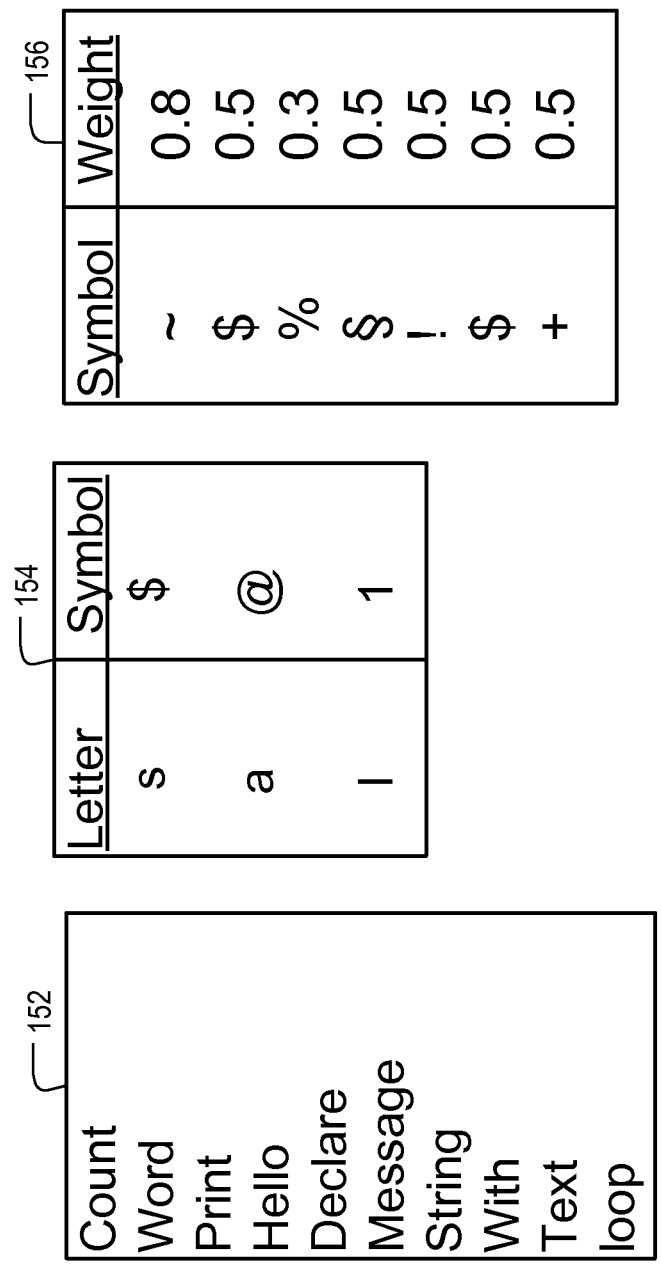
FIG. 4 depicts examples of data structures used by the system of FIG. 1.

In performing its functions, spellchecker 142 may use one or more of dictionary 152, list 154, and list 156. FIG. 4 depicts an example of each of dictionary 152, list 154, and list 156. Dictionary 154 is a list of words. Dictionary 152 may be stored in memory 130 as a file or another data structure. In one aspect, dictionary 152 may be used to identify spelling errors. For example, if a word is not found in the dictionary, the word may be considered misspelled.

List 154, as noted, may be a letter equivalencies list. List 154 may be used by spellchecker 142 to identify spelling errors that occur as a result of substitution of a letter with a symbol that visually resembles the letter. An example of such an error is provided by string 210 where the word "file" is misspelled as "fi1e." Substituting letters with symbols that resemble the letters, in this manner, is often done intentionally by users in order to increase passwords' strength or for aesthetic reasons. Accordingly, spelling mistakes that result from the substitution of a letter with its visual sibling are more likely to be part of a natural language text than other types of mistakes.

List 156, as noted, may include characters or character combinations. The list 156 may be used by spellchecker 142 to draw candidate delimiters from. In one aspect, list 156 may include only non-alphanumeric characters. Non-alphanumeric characters are characters in a source code file that are not numbers or alphabet letters. Limiting the list 156 to non-alphanumeric characters may be advantageous because such characters are very often used by programming languages as comment and string literal delimiters. Although the example of FIG. 4 is limited to non-alphanumeric characters, in other examples list 156 may include letters, numbers, or both letters and numbers.

Furthermore, because programming languages may use character combinations to delimit comments and string literals, the list 156 may include character combinations, such as "/*", and "//," as its entries. Moreover, in some aspects, list 156 may include non-printable characters, such as a newline character or carriage return. The non-printable characters may be viewed as a type of non-alphanumeric characters.

Each of the symbols in the list 156 may be related to a weight which indicates the likelihood of the symbol being used as a comment (or string literal) delimiter. In one aspect, the weight reflects the number of languages, from a predetermined group (e.g., the group of C++, JAVA, C++, Scheme, Prolog) that use the particular symbol as one of (i) a comment delimiter, (ii) string literal, or (iii) both string literal and comment delimiter. For example, the symbol "%" may be used as a comment delimiter in eight out of a group of ten programming languages whereas the symbol "~" is used in three of the languages from the group. Thus, the "%" symbol has a higher weight—"0.8"—than the "~" symbol which is given a weight of "0.3." In that regard, the spellchecker 142 may use a priori knowledge of the syntax of a set of programming languages to improve its odds of guessing the comment (or string literal) delimiters in a source code file that has an unfamiliar syntax.

Figure 5:
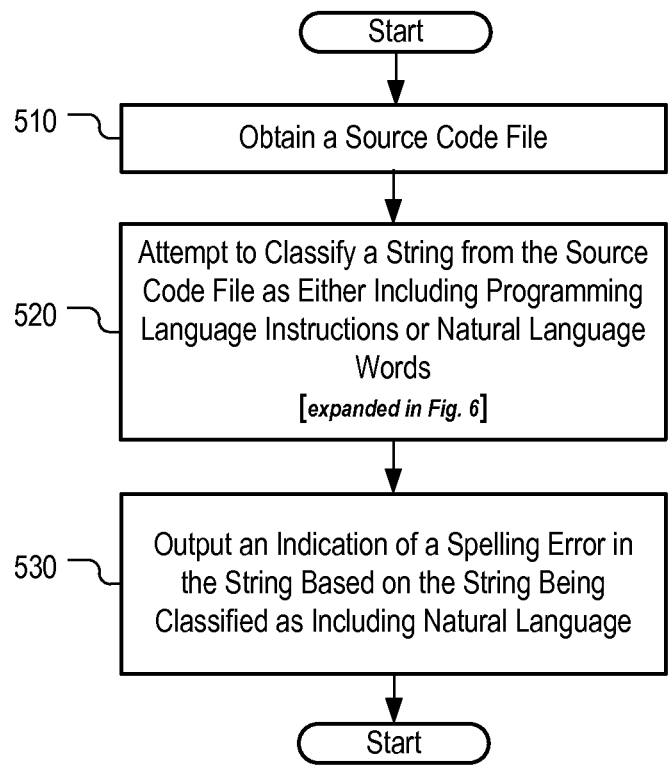
FIG. 5 depicts a flowchart of a process in accordance with aspects of the present disclosure.

FIG. 5 depicts a flowchart of an example process performed by spellchecker 142. At task 510, spellchecker 142 obtains source code file 158. At task 520, spellchecker 142 attempts to classify one or more strings from file 158 as including either programming language instructions or natural language words. At task 530, the spellchecker 142 outputs one or more indications of spelling errors in strings that are classified as including natural language words. Moreover, in one aspect, the spellchecker 142 refrains from showing spelling mistakes found in strings classified as including programming language instructions.

Figure 6:
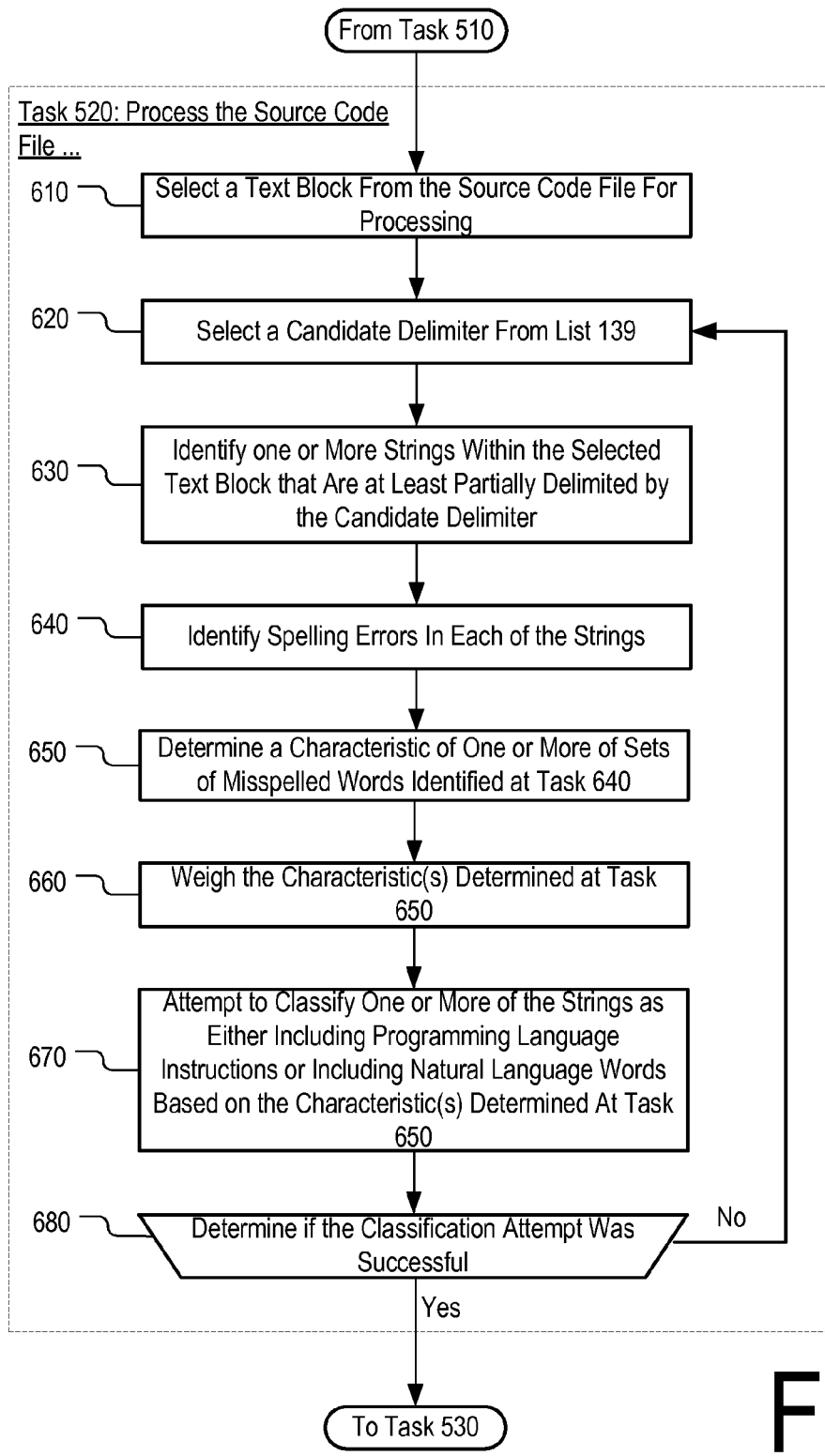
FIG. 6 depicts a flowchart of subtasks associated with FIG. 5.

FIG. 6 depicts a flowchart of example subtasks associated with classifying a string from source code file 158 as shown by task 520 of FIG. 5. At task 610, a text block from file 158 is selected. The text block may be the whole file or a file section, such as a line (e.g. line 220) or a plurality of lines (e.g., section 240). In one example, the section may be selected based on being situated between a first delimiting character and a second delimiting character. In instances where the text block is a single line, the first and second delimiting characters may be the newline character. In instances where the text block comprises multiple lines, such as section 240, the first character may be the newline character, whereas the second predetermined character may be a semicolon. In other words, the first delimiting character may be either the same or different from the second delimiting character. Moreover, in some aspects, the spellchecker 142 may be customized to use any printable and non-printable character found in file 158 as a delimiting character when selecting the text block.

At task 620, spellchecker 142 selects a candidate delimiter from list 156. Spellchecker 142 may select one of the entries in list 156 (e.g., a single character or a character combination) for use as a candidate delimiter. The selection may be at random or based on the weight values found in list 156. For example, entries having higher weight values may be selected first.

At task 630, the text block is processed to identify one or more strings from file 158 that are at least partially delimited by the candidate delimiter selected at task 620. Each string may be a single line of code, a portion of a single line of code (e.g., word or plurality of words), or a plurality of lines of code. Furthermore, the identified string may consist of the entire text block determined at task 610 or it may include only a portion of the text block.

In one aspect, a string is delimited, at least partially, by the candidate delimiter if it starts at the candidate delimiter. An example of one such string is string 210 which starts at delimiter "//." Another example is a string 230 (e.g., "a constant piece of strng") which starts at delimiter "''". Yet another example of a string which starts at a candidate delimiter is string 261 which starts at delimiter "*".

In another aspect, a string is delimited, at least partially, by the candidate delimiter if it ends at the candidate delimiter. An example of one such string is string 260 which may be viewed as ending at delimiters "/" or "/*". Another example of a string that adds at a candidate delimiter is string 261 which ends at delimiter "*".

In yet another aspect, a string is delimited, at least partially, by the candidate delimiter if both starts and ends at instances of the candidate delimiter. Furthermore, in yet another aspect, a string is delimited, at least partially, by the candidate delimiter if the candidate delimiter is part of a character combination, so that the string either (i) starts, (ii) ends, or (iii) both starts and ends at the character combination. An example of such a string is string 260 which is delimited by the character "/". As FIG. 2 illustrates, although the string does not end at the slash character immediately, the slash character is part of the character combination "*/" that is used to delimit the string.

At task 640, one or more of the strings identified at task 630 are spell-checked. For each of the strings that are spell checked, zero or more misspelled words from the string are identified. In one example, the spell-checking is performed by comparing words found in the string to words in the dictionary 152. If a given word matches any of the words in the dictionary, the word is considered correctly spelled. Otherwise, the word is counted as misspelled.

At task 650, a characteristic is determined of the set of misspelled words identified at task 640. In one aspect, the characteristic may be based on the count of spelling mistakes or the count of misspelled words. In another aspect, the characteristic may be based on a property of the distribution of spelling mistakes (or misspelled words) throughout a string. For example, it may measure how uniform the distribution is. Examples of characteristics of a set of misspelled words may include:

C1: Edit distance between one or more misspelled words in the string and correctly-spelled versions of those words.

C2: Count of misspelled words in the string.

C3: Whether a portion of all spelling mistakes (e.g. 90%, 100%) is concentrated in a particular portion of a string (e.g., first half, second half, middle third).

C4: Ratio of misspelled words to correctly spelled words.

C5: Length of the largest series of consecutive misspelled words found in the string. For example, the length of the largest series of consecutively misspelled words in the string "aple bannanna pear pineaple strawbery chery" is three. The words "pineaple strawbery and chery" are consecutive because they are located one after another in the string, and in this case each of them is misspelled.

C6: Whether a pre-set pattern of misspelled words in the string is found (e.g., two consecutive misspelled words followed by a correctly-spelled word followed by another misspelled word).

SUMMARY

At task 670, the characteristic determined at task 660 is adjusted. In one aspect, the characteristic is adjusted based on the type of one or more of the spelling mistakes found at task 640. For example, one type of error occurs when letters are substituted with symbols that are identified as visually similar to the letters by list 154. One such letter-symbol pair consists of the letter "1" and the number "1." An example of an error resulting from the substitution of a letter with its visual sibling is found in the string 210 of FIG. 2 where the word "File" is misspelled as "Fi1e." When such errors occur, the count of misspelled errors (identified at task 650), may be scaled down. As noted above, errors of this type may be more likely than other errors to be intentionally inserted by users in order to alter the aesthetic appeal of natural language text (e.g., comments). As a consequence, the incidence of such errors may be less indicative of whether a given string includes programming language instructions or natural language words.

Capitalization errors are another type of errors that may be scaled down. For example, a case sensitive spellchecker may find the word "eRror" as being misspelled in much the same way as the word "eror." However, because users may employ irregular capitalization for aesthetic purposes or to increase password strength, the count of errors in a string (or another characteristic of the set of misspelled words) may also be scaled down when such errors occur.

As another example, the characteristics of the set of misspelled words may be scaled in accordance with a characteristic of the distribution of misspelled words found in the string. For example, if a series of three consecutive words in a string are misspelled, the count of misspelled words in the string may be scaled up (e.g., multiplied by two). An ordinary typist may be deemed unlikely to misspell three words in a row, thus the presence of three consecutive misspelled words may be taken to indicate that a given string is highly likely to include programming language instructions.

At task 680, spellchecker 156 attempts to classify one or more of the strings identified at task 630 as either (i) including programming language instructions or (ii) including natural language words. The classification may be based on a classification rule. In one aspect, the application the classification rule may yield a successful outcome under all circumstances. In another aspect, the application of the classification rule may result in either successful or unsuccessful outcome. The classification of a string may be considered successful if the string is classified as either including natural language words or including programming language instructions. Alternatively, the classification may be considered unsuccessful if the classification rule results in an inconclusive outcome, in which case the string is not classified into any of the available categories.

In one aspect, the rule may be based on a characteristic of the set of misspelled words found at task 640. The characteristic may be the "raw" characteristic obtained at task 650 or the "adjusted" version of the same characteristic obtained at task 660. For example, such rules may include:

R1: Classify a string as including natural language words if the count of spelling errors in the string exceeds a threshold (e.g., 5, 10, 20).

R2: Classify a string as including programming language instructions if the ratio of correctly spelled words to incorrectly spelled words in the string exceeds a threshold. For example, classify the string as including source code if the ratio is less than one.

R3: Classify a string as including natural language if a count of correctly spelled words (e.g., total number of words in string less the number of misspelled words) exceeds a threshold. Classify the string if including natural language if more than five correctly spelled words are found in the string.

R4: If the distribution of spelling errors in string is biased towards one end of the string, (e.g., 80% of misspelled words are located in one half of the string) classify the string as indeterminate. The rationale for this rule may be that when a string features two regions where one has many spelling mistakes and the other very few, it is likely that string includes both source code portions and natural language portions.

In another aspect, the rule may specify a criterion for a string to be classified as including a natural language words and a criterion for a string to be classified as including programming language instruction. If neither of the two criteria is satisfied, the rule may yield an inconclusive outcome. An example of one such rule may include:

R5: If the count of misspelled words found in a string is within a first interval (e.g., 10-to-15), classify string as including programming language instructions; if the count of misspelled words found in the string is within a second interval (e.g., 0-5), classify the string as including natural language words; otherwise return an inconclusive outcome.

In yet another aspect, the rule may be based on the relative characteristics of strings from the same text block. For example, such rules may include:

R6: If two or more strings are identified in a text block, classify the string with more spelling mistakes as including programming language instructions.

R7: If two or more strings are identified in a text block, classify the string with the least number of spelling mistakes (or misspelled errors) present in it as including natural language words.

R8: If a text block is partitioned into two or more strings, classify the strings with the highest ratio of correctly spelled words to incorrectly spelled words as natural language.

In yet another aspect, the classification rule may be based on a count of symbols from a specific type (e.g., non-alphanumeric symbols, alphanumeric symbols, lower-case characters, upper case characters, numbers, or a custom set of characters that is stored in memory 130). For example, such rules may include:

R9: Classify a string as including programming language instructions if the count of non-alphanumeric symbols found in the string exceeds a threshold.

R10: Classify a string as including programming language instructions if the ratio of non-alphanumeric symbols to alphanumeric symbols found in the section exceeds a threshold.

In yet another aspect, the rule may be based on the classification of other strings from the same block. For example, such rules may include:

R11: If the majority of other strings in the same text block are classified as one type (e.g., including natural language words), classify the string that is being considered into the same type.

R12: If two strings that are adjacent to a string that is being considered are classified as including natural language, classify the string the considered string between them as including natural language instructions as well.

Stated succinctly, the rule applied to one or more of the sections determined at task 620 may be based on any of the information determined at tasks 640-650. It should be noted that the rules above are provided as examples only. Furthermore, it should be noted that two or more of the rules may be used to classify a string. For example, the rules may be applied in a sequence or combined in a single rule and applied simultaneously.

At task 680, it is determined whether the classification of one or more of the sections classified at task 630 was successful. Upon a negative determination, one or more of tasks 620-650 may be repeated. In one aspect, an unsuccessful classification could mean that the spellchecker 142 guessed incorrectly when choosing a candidate delimiter and the candidate delimiter selected at task 620 is not used as a comment delimiter (or string literal delimiter) in the source code file 158. Accordingly, upon an unsuccessful classification, spellchecker 156 may choose another candidate delimiter and again test to determine whether the new candidate delimiter is useful in separating comments and other natural language words from programming language instructions.

FIGS. 5-6 are provided as an example. At least some of the tasks and subtasks associated with FIGS. 5-6 may be performed in a different order than represented, performed concurrently or altogether omitted. For example, tasks 610 and 680 may be omitted in one scenario.

Although the example of FIGS. 5-6 involves spellchecking of source code files, the disclosure is not limited to this context only. The concepts and principles described herein may be employed in any context where one may wish to flag spelling mistakes in only one portion of a file (or document) that is being spellchecked while refraining from flagging the spelling mistakes in another portion of the same file. To that effect, tasks 530 and 680 may involve the classification of string(s) into a first category and a second category, without either of the two categories having to do anything with source code and/or natural language. As long as a string meets classification criteria such as those provided in the example of task 680, it may be proper to classify a string from a file into one of at least a first category and second category in the manner described above.

As these and other variations and combinations of the features discussed above can be utilized without departing from the subject matter as defined by the claims, the foregoing description of exemplary aspects should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A system for spellchecking source code files, the system comprising:
   a memory for storing a source code file, and a list of candidate delimiters;
   a processor coupled to the memory, the processor being configured to:
   select a first delimiter from the list of candidate delimiters;
   process the source code file to identify a first string in the source code file that is delimited at least in part by the first delimiter;
   check spelling of the first string to identify a first set misspelled words in the first string;
   determine whether the first string meets a predetermined criterion, the predetermined criterion being based on a characteristic of a first set of misspelled words;
   in response to determining that the first string fails to meet the predetermined criterion, select a second delimiter from the list of candidate delimiters;
   process the source code file to identify a second string in the source code file that is delimited at least in part by the second delimiter;
   check spelling of the second string to identify a second set of misspelled words in the second string;
   when the second string satisfies the predetermined criterion, classify the second string as either natural language or programming language instructions, the classifying being based on a characteristic of the second set of misspelled words; and
   output indications of spelling mistakes in the second string only when the second string is classified as natural language.

2. The system of claim 1, wherein the first string includes one or more lines of source code.

3. The system of claim 1, wherein the first string includes a portion of a line of source code.

4. The system of claim 1, wherein the first delimiter includes a character combination.

5. The system of claim 1, wherein the first delimiter includes non-printable characters.

6. A computer-implemented method for spellchecking source code files, the method comprising:
   storing, in a memory, a source code file and a list of potential delimiters;
   selecting a first candidate delimiter from the list of potential delimiters;
   processing the source code file to select a string from the source code file that is delimited at least in part by the first candidate delimiter;
   checking spelling of the selected string to identify a set of misspelled words therein;
   determining whether the first candidate delimiter is used to separate source code from comments in a programming language of the source code file, the determining being based on a first characteristic of the set of misspelled words;
   when it is determined that the first candidate delimiter is used to separate source code from comments in the programming language of the source code file:
   (i) classifying, by a processor, the selected string as one of natural language or programming language, the classifying being based on a second characteristic of the set of misspelled words; and
   (ii) generating an indication that a word in the selected string is misspelled, the indication being output for presentation to a user only when the selected string is classified as natural language; and
   when it is determined that the selected candidate delimiter is not used to separate source code from comments in the programming language of the source code file, selecting a second candidate delimiter from the list of potential delimiters.

7. The computer-implemented method of claim 6, further comprising:
   determining a count of any misspelled words in the selected string;
   wherein the second characteristic includes the count of misspelled words.

8. The computer-implemented method of claim 6, wherein the second characteristic includes a pattern in which misspelled words and correctly spelled words are arranged in the selected string.

9. The computer-implemented method of claim 6, wherein the first candidate delimiter includes a non-printable character.

10. The computer-implemented method of claim 6, wherein the first candidate delimiter includes a combination of multiple characters.

11. The computer-implemented method of claim 6, wherein the first characteristic is different from the second characteristic.

12. The computer-implemented method of claim 6, wherein the first characteristic is the same as the second characteristic.

\* \* \* \* \*